(12) United States Patent
Sanders

(10) Patent No.: US 8,540,013 B1
(45) Date of Patent: Sep. 24, 2013

(54) HEAT EXCHANGER WITH POSITIVE LOCK

(76) Inventor: Leon Sanders, Auburn, WA (US)

( * ) Notice: Subject to any disclaimer, the term of this patent is extended or adjusted under 35 U.S.C. 154(b) by 791 days.

(21) Appl. No.: 12/731,091

(22) Filed: Mar. 24, 2010

(51) Int. Cl.
*F28F 3/00* (2006.01)

(52) U.S. Cl.
USPC ........... 165/166; 165/167; 411/349; 411/549; 411/551; 292/57; 292/58; 292/63; 292/64; 403/348; 70/181

(58) Field of Classification Search
USPC ................. 165/166–167; 92/15–28; 292/57, 292/58, 63, 64; 411/349, 549, 551
See application file for complete search history.

(56) References Cited

U.S. PATENT DOCUMENTS

| | | | |
|---|---|---|---|
| 2,015,819 A * | 10/1935 | Seligman et al. | 165/78 |
| 2,062,549 A * | 12/1936 | Wold | 73/669 |
| 3,269,600 A * | 8/1966 | Weber, III | 411/349 |
| 3,664,434 A * | 5/1972 | Connor et al. | 411/349 |
| 3,678,809 A * | 7/1972 | Doutt | 92/86 |
| 4,598,898 A * | 7/1986 | Hsu et al. | 254/93 H |
| 5,765,696 A * | 6/1998 | Pryor | 209/275 |
| 7,343,695 B2 | 3/2008 | Memory et al. | |
| 7,654,308 B2 | 2/2010 | Hofmann | |
| 7,669,643 B2 | 3/2010 | Ekelund et al. | |
| 7,677,301 B2 | 3/2010 | Blomgren | |
| 2004/0188060 A1 * | 9/2004 | Finch et al. | 165/67 |
| 2010/0065251 A1 * | 3/2010 | Hoglund et al. | 165/166 |

FOREIGN PATENT DOCUMENTS

| | | | |
|---|---|---|---|
| JP | 55-094008 | * | 7/1980 |
| JP | 57-038914 | * | 3/1982 |

OTHER PUBLICATIONS

Translation of Hamazaki—JP 57-038914.*
English Abstract of Ide—JP 55-094008.*
Thermaline, Inc., company brochure, 1302 West Main #25, Auburn, WA 98001, May 2009.

* cited by examiner

*Primary Examiner* — Cheryl Tyler
*Assistant Examiner* — Orlando E Aviles Bosques
(74) *Attorney, Agent, or Firm* — Joseph Z. Ellsworth

(57) ABSTRACT

A heat exchanger with a plurality of heat transfer plates between a frame and a movable plate employs hydraulic rams connected above and below the heat transfer plates to move the movable plate toward or away from the frame in a releasable clamping action against the heat transfer plates. A positive lock maintains the movable plate in its operational position. Supports above and below the heat transfer plates support and guide the movable plate and heat transfer plates. Thus, the heat transfer plates are removable from between the stationary and follower plates for replacement and maintenance when the movable plate is moved away from the frame without further reconfiguration or dismantling of the plate heat exchanger.

17 Claims, 8 Drawing Sheets

HEAT EXCHANGER WITH POSITIVE LOCK

BACKGROUND

1. Field of the Invention

This invention relates to heat exchangers comprising a movable plate movable toward a frame with a plurality of heat transfer plates releasably clamped therebetween in an operational mode, and more specifically to such a heat exchanger with heat transfer plates unencumbered on its sides allowing lateral removal of heat transfer plates when the movable plate is withdrawn by action of a plurality of hydraulic rams and further having a positive lock securing the movable plate in its operational position.

2. Prior Art

It is known to have heat exchangers that comprise a plurality of heat transfer plates clamped into face-to-face contact by a movable plate urging the plurality of heat transfer plates against a frame. Previously, the plates have been urged together by spindles, or threaded rods, rotated by a drive motor. However, the spindles limited access for installation and removal of the heat transfer plates and a substantial portion of the heat exchanger had to be dismantled before heat transfer plates could be installed or removed. To remove the heat transfer plates for inspection and maintenance, it is advantageous to employ a mechanism that moves the movable plate away from the frame that leaves the heat exchanger plates unencumbered by tie rods or other system paraphernalia. Use of hydraulic rams have been employed that provide the advantageous access, however, hydraulic rams are known to lose pressure over time, therein allowing the plates to separate, causing a system failure as fluids intended to remain separate as they pass through the heat exchanger plates begin to seep through fluid seals in the heat exchanger plates causing cross contamination. In order to employ hydraulic rams to gain desired access for installation and removal of heat exchanger plates, it is necessary to employ a positive lock that is not dependent on pressure of the hydraulic rams to maintain the heat transfer plates in their operational position and condition.

SUMMARY OF THE INVENTION

These requirements are achieved in a heat exchanger with a plurality of heat transfer plates between a frame and a movable plate. Hydraulic rams effect movement of the movable plate toward, and away from, the frame in releasably clamping the heat transfer plates together in sealing face-to-face contact such that fluids can pass between them without leaking and cross-contaminating.

With the movable plate moved away from the frame, unencumbered access to the plurality of heat transfer plates is enabled and a heat transfer plate is then removable by simply tilting it toward the frame and away from the moving plate and other heat transfer plates in disengaging it from an upper support bar and a lower support rod that extend between the frame and the moving plate and support and guide the heat exchanger plates in the heat exchanger.

Hydraulic rams connect between the frame and the movable plate above and below the heat transfer plates to facilitate lateral removal of a heat transfer plate from the heat exchanger when the follower plate is withdrawn without the necessity of dismantling the heat exchanger. As the sole means for driving the follower plate, use of the hydraulic rams advantageously eliminates the need for a drive apparatus for threaded tie rods as in previous heat exchangers. Hydraulic rams are inherently more reliable and less costly. Instead of a complicated arrangement of mechanical drive motors, belts, gears, pulleys and tensioners, a hydraulic pump actuates a hydraulic ram over and under the heat transfer plates. Typically, a hydraulic ram cylinder connects to the frame plate and the hydraulic ram rod telescoping from the hydraulic ram cylinder connects to the movable plate, together cooperating to adjust the effective length between the frame and the movable length.

A single hydraulic pump distributes equal hydraulic pressure to the hydraulic rams. As a consequence equal force is applied to the movable plate from the hydraulic rams and the movable plate closes smoothly and evenly across the heat transfer plates so they in turn mutually contact evenly across their faces establishing an effective fluid seal between them.

To overcome the effect of loss of hydraulic pressure within the hydraulic rams, a mechanical lock is provided in a slide on an extension between the hydraulic ram rod and the movable plate that when engaged prevents the hydraulic ram rod from moving relative to the frame. Because the hydraulic ram determines the operational position of the movable plate, the movable plate is maintained in its operational position even with the loss of hydraulic pressure as a consequence of the mechanical lock preventing the hydraulic ram rod from moving. Before the movable plate can be moved out of its operational position, the mechanical lock must be disengaged.

An adjustment of the effective length between the frame and the movable plate in the operational position is provided on the extension to accommodate a difference in the plurality of heat transfer plates employed in the heat exchanger.

DETAILED DESCRIPTION OF THE PREFERRED EMBODIMENT

Figure 1:
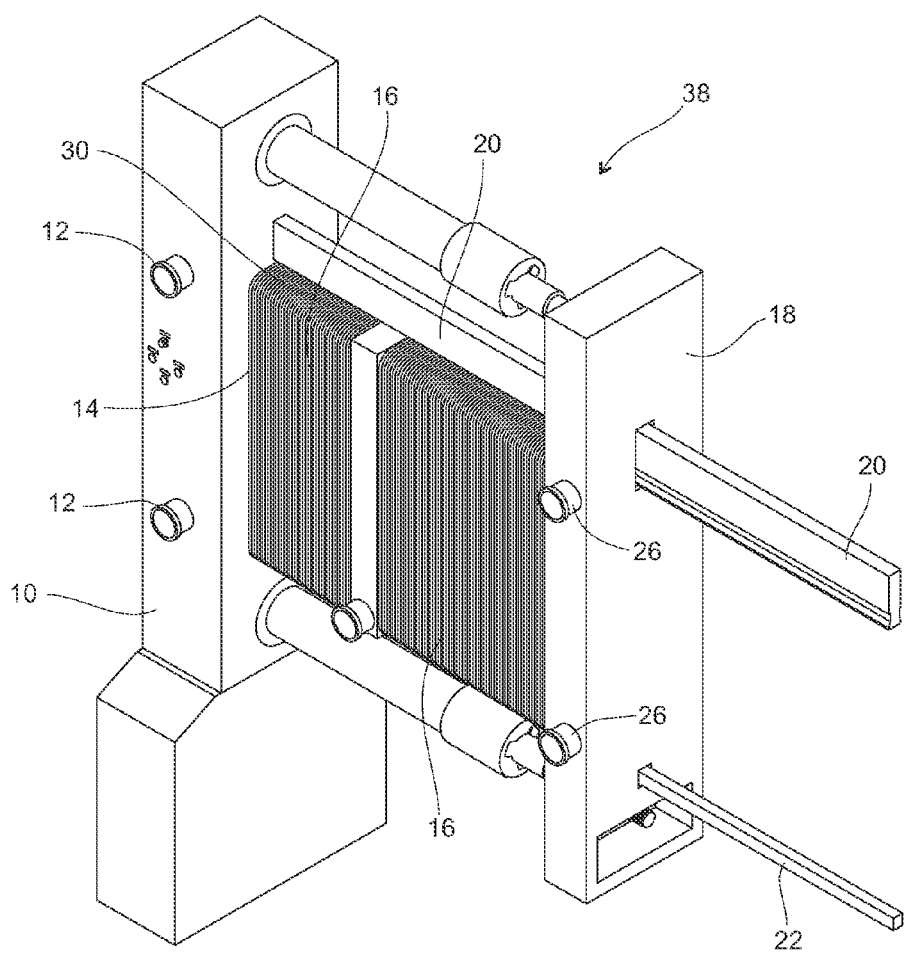
FIG. 1 is a right perspective view of the heat exchanger of the present invention.
Figure 2:
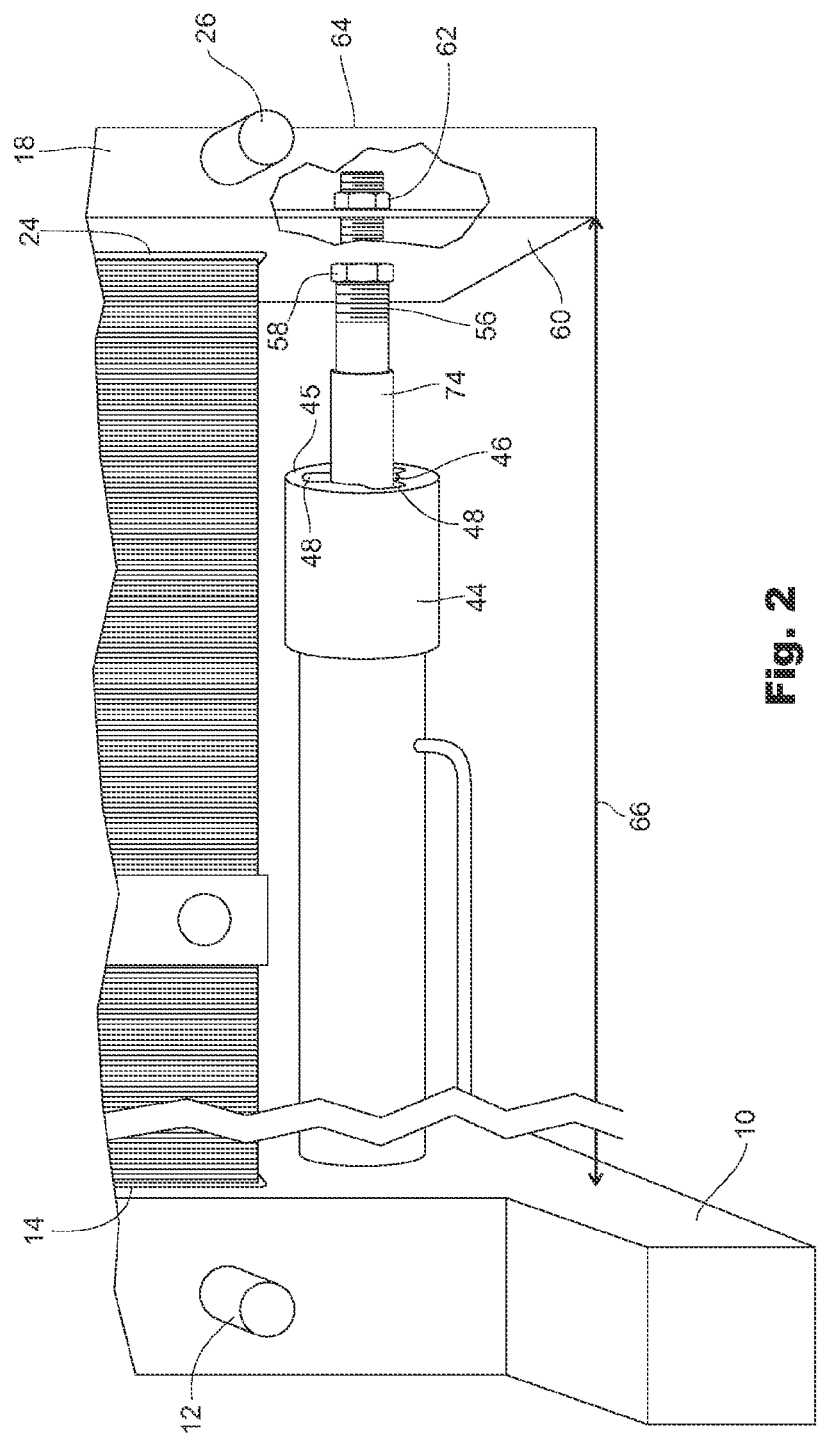
FIG. 2 is a partial perspective view of a the plate heat exchanger of FIG. 1 showing plurality of heat transfer plates, a housing and a slide on an extension, all extending between a frame.
Figure 3:
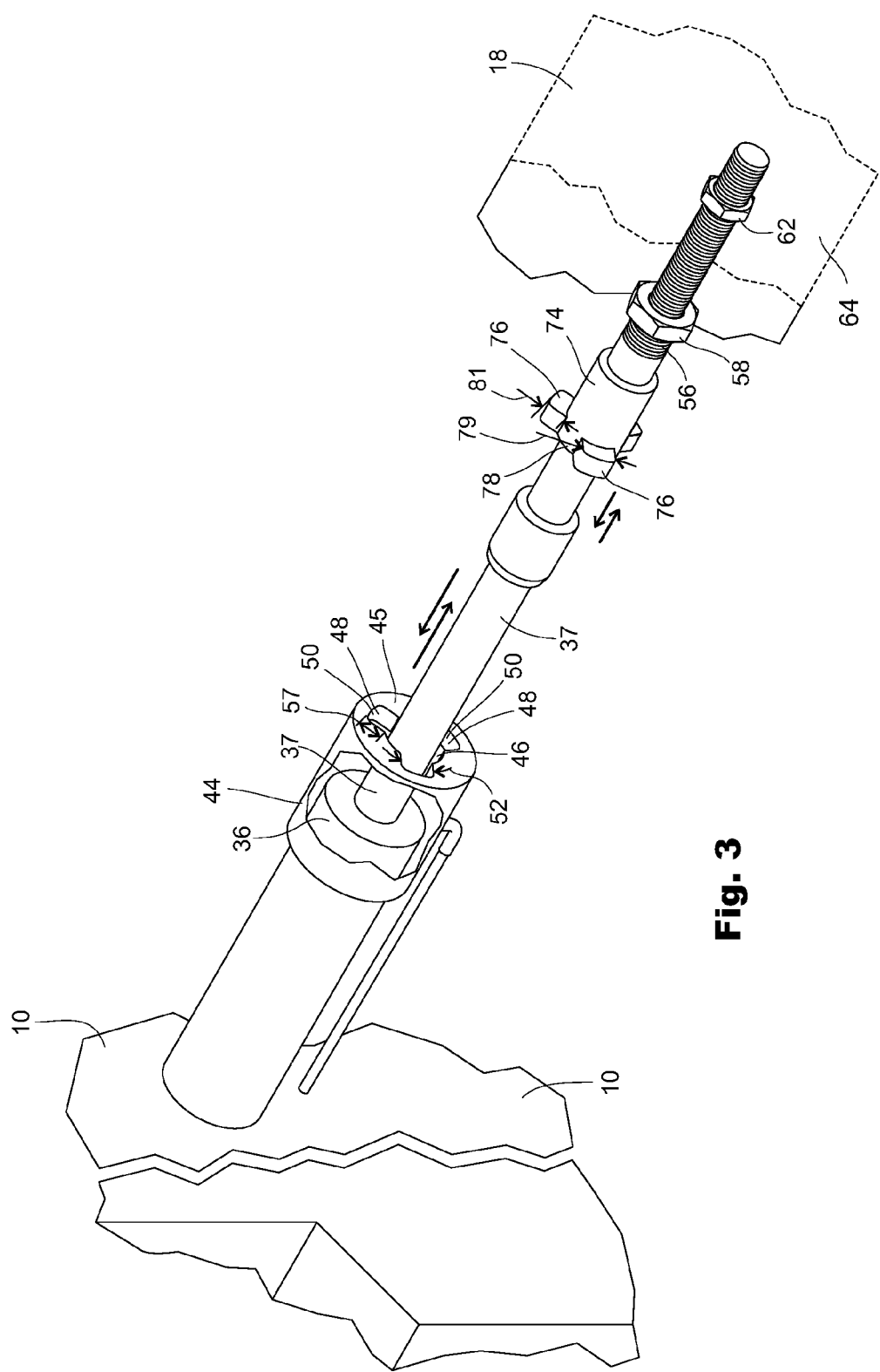
FIG. 3 is a perspective view, including a cut-way view, of a hydraulic ram in and extending from the housing with the slide on the extension.
Figure 4:
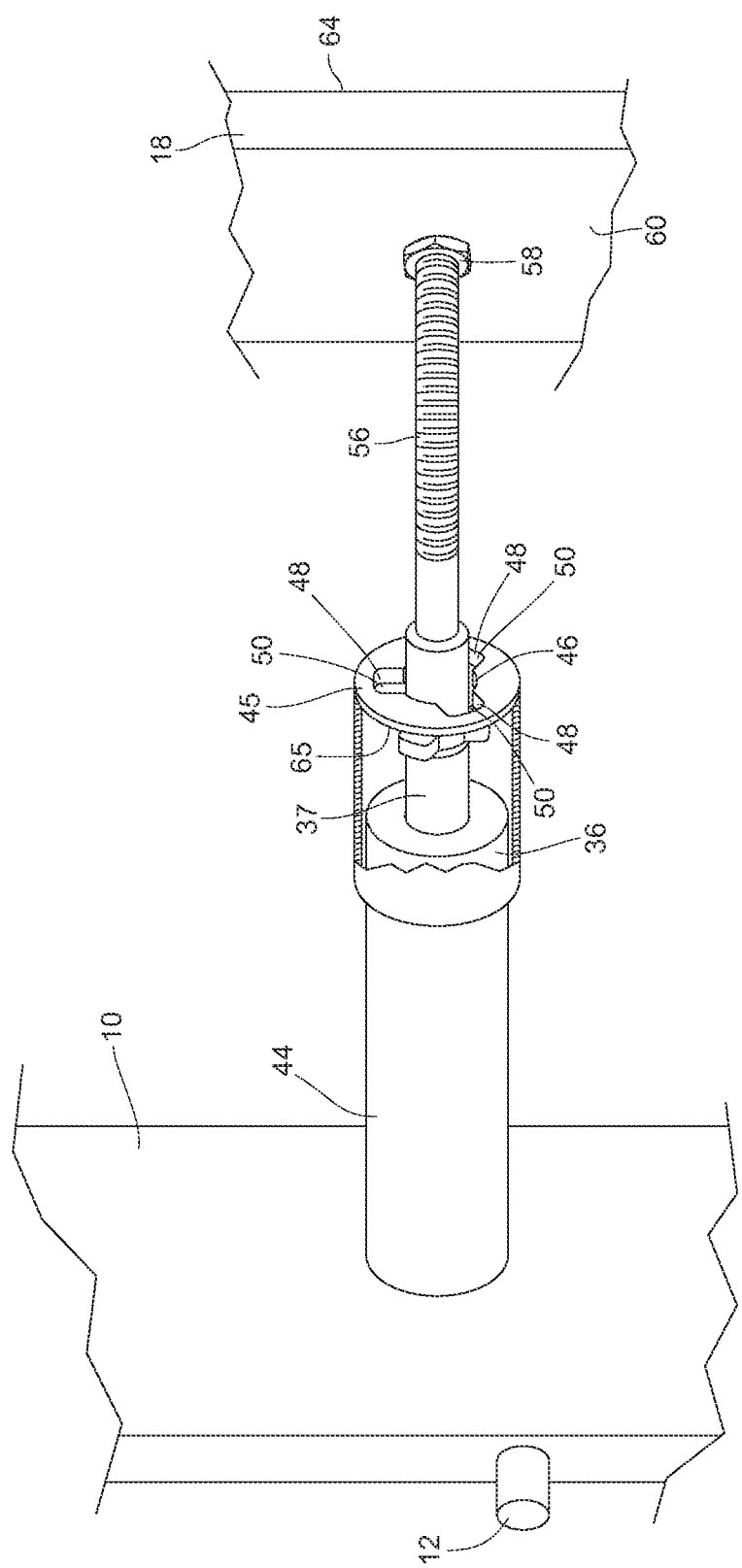
FIG. 4 is a further cut-away perspective view of the housing, hydraulic ram and extension of FIG. 2 shown with ears of the slide within the housing.
Figure 5:
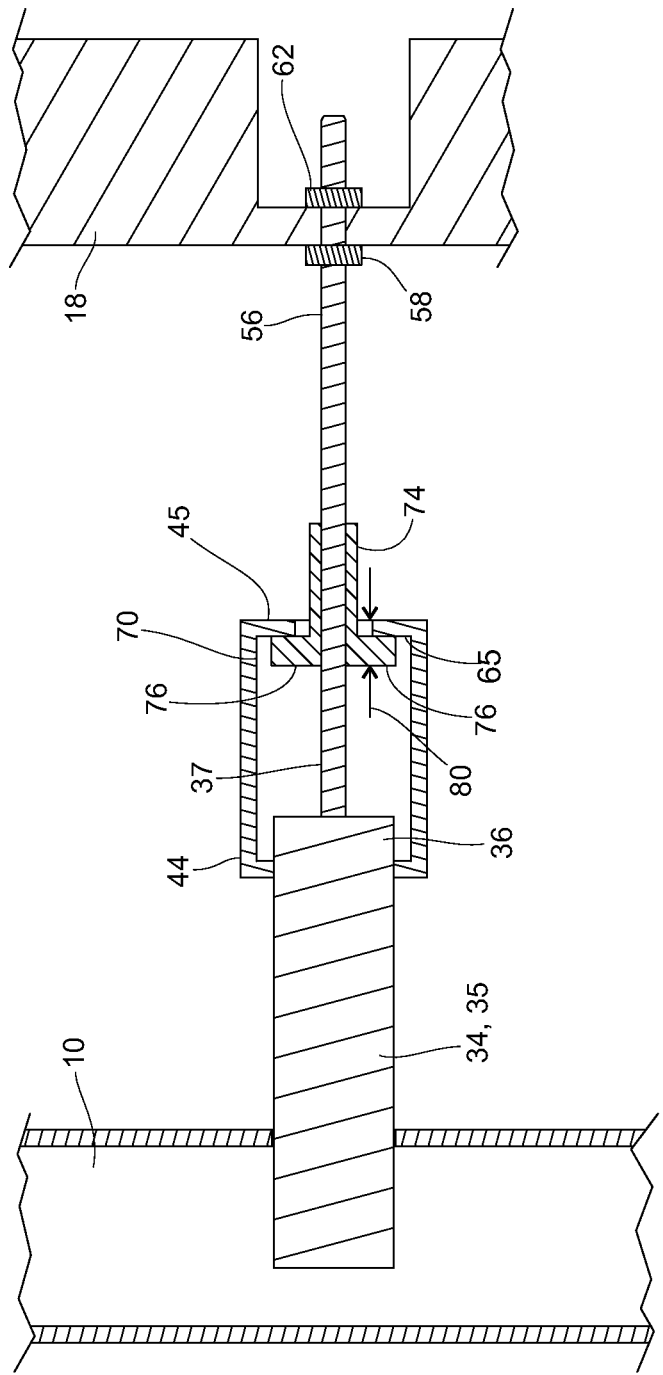
FIG. 5 is a sectional view of the housing, hydraulic ram, slide and extension of FIG. 4.
Figure 6:
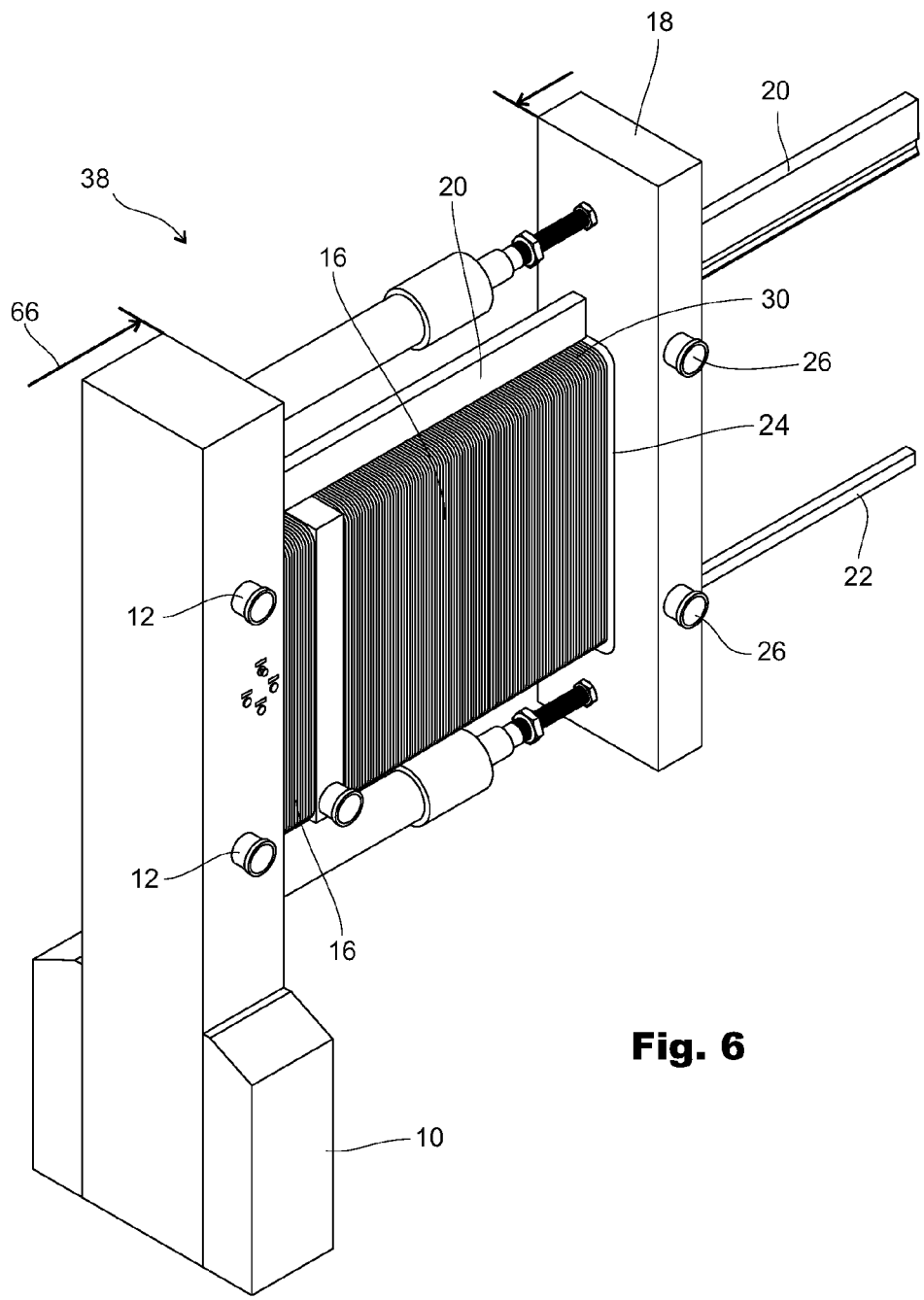
FIG. 6 is a left perspective view of the heat exchanger of FIG. 1, shown in operational position.
Figure 7:
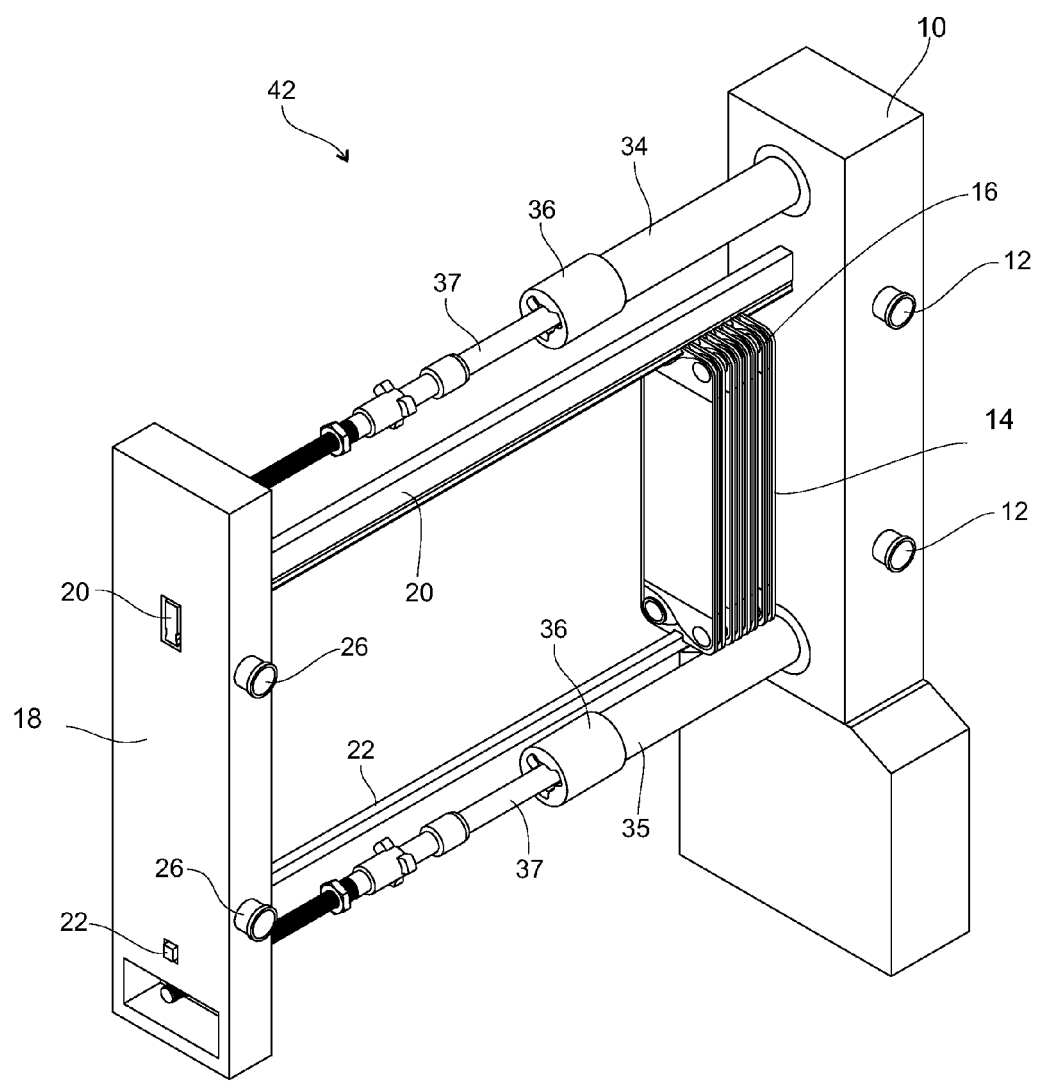
FIG. 7 is a left perspective view of the heat exchanger of FIG. 6, shown in non-operational position.
Figure 8:
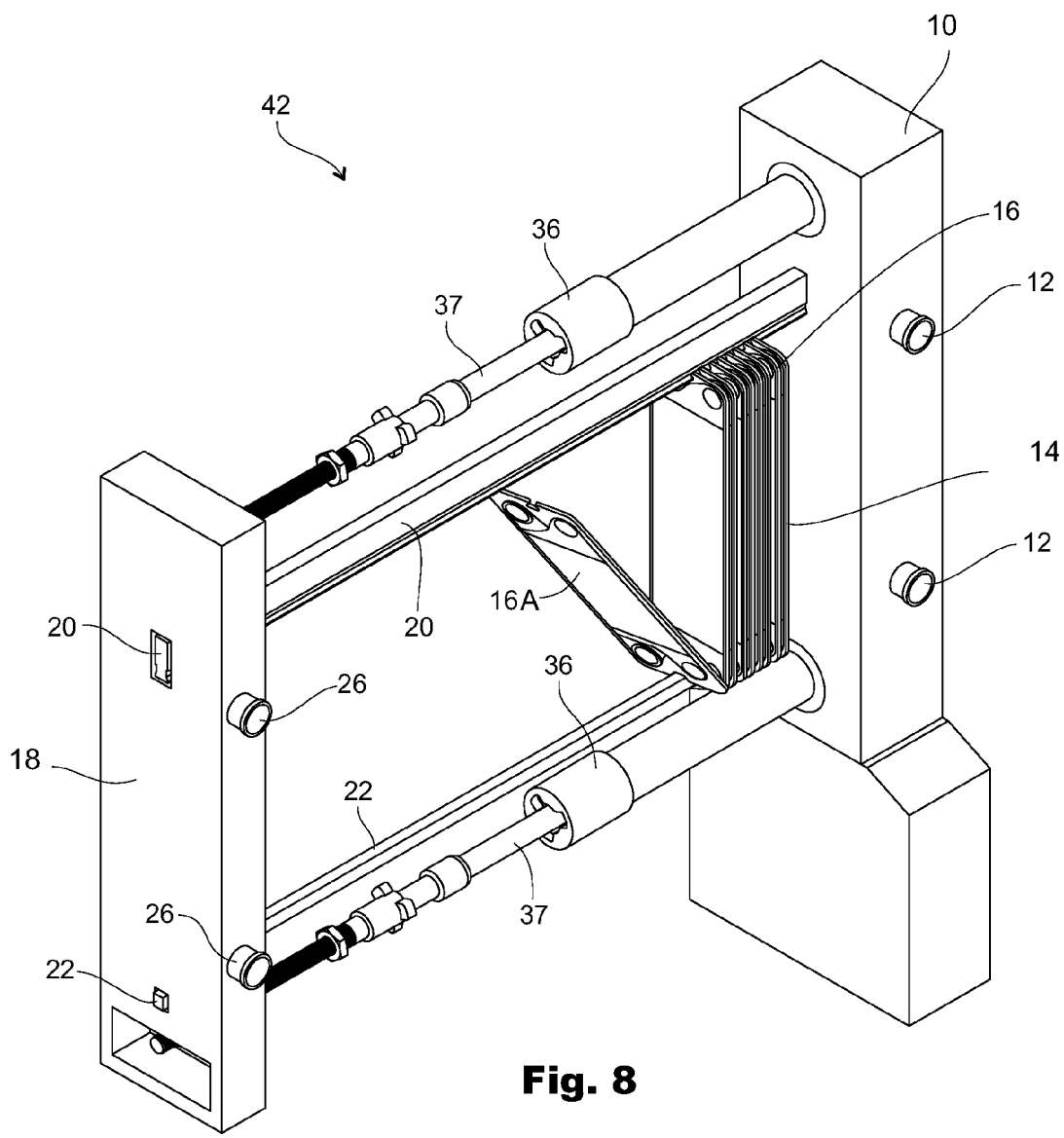
FIG. 8 is the heat exchanger of FIG. 7 shown with a heat exchanger plate partially removed from the heat exchanger.
Figure 9:
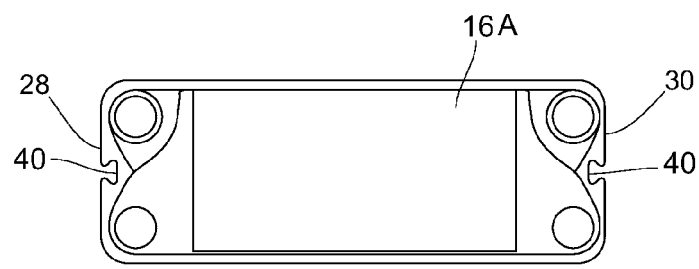
FIG. 9 is a front view of heat exchanger plate.

The heat exchanger of the present invention for use in the food industry comprises a frame 10 with frame ports 12 through which fluids may be introduced into the heat exchanger and with a frame heat transfer plate interface 14 as a stationary plate adapted to provide fluid communication to a plurality of removable heat transfer plates 16 as the heat transfer plates 16 are urged against the frame heat transfer plate interface 14. A movable plate 18, sometimes known as a follower plate, is slidably supported vertically on an upper support bar 20 that extends horizontally from the frame over the heat transfer plates 16 and a support rod 22 that also extends horizontally from the frame but under the heat transfer plates 16. The movable plate 18 includes a movable plate heat transfer plate interface 24 that provides fluid communication between the heat transfer plates 16 and the movable plate 18 when the heat transfer plates 16 are urged against the movable plate 18. The movable plate 18 includes movable plate ports 26 through which fluids may be introduced and removed from the heat exchanger and specifically the movable plate 18.

The heat transfer plates 16 are installed in the heat exchanger by engaging a bottom 28 of the heat exchanger plates with the support rod 22 and by engaging a top 30 of the heat exchanger plates with the support bar 20. The heat exchange plates 16 are identical and adapted with matching ports such that when they are assembled side by side into a plurality of heat exchanger plates 16 with a fluid seal formed between adjacent heat exchanger plates, fluid communication is established between and through the plurality heat exchanger plates 16 such that separate fluids introduced into the plates pass into and through each respective heat exchanger plate and out of each respective heat exchanger plate 16 with the fluids remaining separate in the normal manner of heat exchangers that employ removable heat exchanger plates. With a plurality of the heat transfer plates 16 thus installed the heat exchanger, the heat transfer plates 16 stand vertically between the frame 10 and the movable plate 18. When the movable plate 18 is urged against the plurality of heat exchanger plates 16 into compression against the frame 10, fluid communication is established between the frame 10 through the frame heat transfer plate interface 14, the plurality of heat transfer plates 16 and the movable plate 18 through the movable heat transfer plate interface 24.

The movable plate 18 moves on the support bar 20 and the support rod 22 by a clamping mechanism that urges the movable plate 18 toward and away from the frame 10. The clamping mechanism could be any of several mechanisms that achieve the desired function, such as rotating threaded rods engaging matching threaded nuts or tubes functioning between the frame and the moving plate, and all such known mechanisms of moving an object toward another object are deemed included in the description of the clamping mechanism given. In the best embodiment, the clamping mechanism comprises an upper hydraulic ram 34 and a lower hydraulic ram 35 extending between the frame and the movable plate 18. The hydraulic rams 34, 35 together operate as a clamping mechanism and an adjusting member to change an effective length between the frame 10 and the moving plate 18, the hydraulic rams moving the moving plate 18 toward or away from the frame 10 in a releasable clamping action against the heat transfer plates 16. Each of the upper and lower hydraulic rams 34, 35 comprises a hydraulic ram cylinder 36 connected to the frame 10 and with a hydraulic ram rod 37 telescoping from the hydraulic ram cylinder 36 under hydraulic pressure to connection to the movable plate 18. The upper and lower hydraulic rams 34, 35 are provided above and below the support bar 20 and the support rod 22 respectively and are adapted to move in mutual cooperation such that the movable plate 18 moves in constant orientation relative to the frame 12 such the movable plate 18 does not bind on the support bar 20 and the support rod 22 and the heat transfer plates 16 are compressed together with uniform pressure across the face 16A of each heat transfer plate 16.

Thus, when the hydraulic rams 34, 35 retract to an operational position 38 they draw the moving plate 18 against the heat transfer plates 16 between the frame 10 and the moving plate 18 in a clamping action. When the hydraulic rams 34, 35 extend, they release their clamping action, allowing the heat transfer plates 16, bound within the heat exchanger only by the clamping action, to be removed for maintenance or replacement.

The heat transfer plates 16 include grooves 40 that match tongues (not shown) in the support bar 20 and the support rod 22 with their grooves 40 receiving the tongues of the support bar and rod 20, 22. When a heat transfer plate 16 is removed (or inserted), it may be tilted toward the frame plate 10 or the moving plate 18 or twisted until its grooves 40 release from the support beam tongues. It is then moved laterally and removed from the heat exchanger. Installation of a heat transfer plate 16 is similar in reverse order.

As described, the hydraulic ram rod 37 operates to move the moving plate between operational and non-operational positions, 38 and 42 and determines pressure on the heat transfer plates 16. To maintain necessary pressure of the moving plate 18 against the heat transfer plates 16 during operation it is necessary to maintain the hydraulic ram rod 37 in its position that defines the operational position 38. Because it is the nature of hydraulic rams to leak pressure over time and because it is necessary to maintain a constant pressure against the heat transfer plates 16 during operation of the heat exchange, it is necessary to provide a positive mechanical lock that locks the moving plate relative to the frame that is independent of the drift typical of the hydraulic rams. This could achieved in several ways, even as simply as fixing a bar between the end of the telescoping hydraulic ram rod and the frame. With the hydraulic ram cylinder thus fixed to the frame and the telescoping hydraulic ram rod constrained from moving relative to the hydraulic ram cylinder by way of the positive lock, the telescoping rod is prevented from moving as it loses hydraulic pressure and otherwise would yield to compressive pressure of the heat transfer plates tending to separate from each other.

The best embodiment, however, is not such a bar but a releasable positive connection that is quick and facile in operation and remains an operational component during any status of the heat exchanger. For all purposes herein, the term "positive lock" as used herein is deemed to mean a mechanical lock that prevents the hydraulic ram rod from moving.

In the preferred embodiment, the positive lock comprises, for each hydraulic ram 34, 35, a hydraulic ram housing 44 is provided affixed to near the end of the hydraulic ram cylinder and has an end 45. The hydraulic ram rod 37 telescopes from the hydraulic ram cylinder 36 out of the hydraulic ram housing 44 through a hole 46 in its end 45. The end hole 46 includes at least one key way 48, and typically comprises three cooperating keyways, each comprising a channel 50 opening into the end hole 46, each channel 50 having a channel width 52 and a channel length 57 with each channel 50 providing access through the housing end 45 to the respective hydraulic ram 34, 35 additional to the end hole 46.

A tubular hydraulic ram rod extension 56 that is at least partially threaded extends coaxially from the hydraulic ram rod 37 and extends through or into the moving plate 18 where it is adjustably connected to the moving plate 18. A first nut 58 is provided on the extension 56 on a first side 60 of the moving plate and a second nut 62 is provided on a second side 64 of the moving plate 18. Because the necessary, or effective length 66 of the hydraulic ram 34, 35 varies based on the number of heat transfer plates 16 being employed, it is necessary to provide an adjustment of the effective length 66, that is the necessary length between the moving plate 18 and the frame 10 that maintains the plurality of heat transfer plates 16 under functional pressure during operation of the heat exchanger. This adjustment is achieved by moving the first and second nuts 58, 62 on the extension 56 until the effective length 66 is obtained. This adjustment is determined by actuating the hydraulic rams 34, 35 to move the movable plate 18 as necessary to obtain the necessary compression of the heat transfer plates 16. With the hydraulic rams 34, 35 in that operational position 38, the first and second nuts 58, 62 are secured tightly on each side 60, 64 of the moving plate 18. That adjustment is maintained fixed until the number of heat transfer plates 16 changes. That adjustment is also such that the hydraulic ram rod 37 is spaced apart from the inside of the housing end 65 by a certain distance forming an effective keyway slot of slot 70 thickness equal to that distance.

A tubular slide 74 is provided that moves freely along the extension 56 between the hydraulic ram rod 37 and the first nut 58 on the extension 56. Slide ears 76 extend radially from a slide first end 78 which slide first end 78 may slide into abutment with the hydraulic ram rod 37. The slide ears 76 are configured on the slide 74 to match the keyway channels 50 with slide ear widths 79 and lengths 81 slightly smaller than matching keyway channel widths 52 and lengths 57 to facilitate the movement of the slide ears 76 through the keyway channels 50. The slide ears 76 also are configured with a slide ear thickness 80 that closely matches the keyway slot 70. Thus, with the heat exchanger in operational position 38 under pressure from the hydraulic rams 34, 35, to engage the positive lock comprising the keyway 48 and slide 74, the slide is moved into abutting engagement with the hydraulic ram rod 37 with the slide ears 76 passing through the key channels 50 with the slide ears 76 within the keyway slot 70. The slide 74 is then rotated on the extension 56 moving the slide ears 76 away from the keyway channels 50 and between the hydraulic ram rod 37 and the housing end 45. The hydraulic ram rod 37 is thus prevented from escaping the slot 70 and thus prevented from further movement until the hydraulic ram 34, 35 is again actuated and the slide 74 is rotated with the slide ears 76 in alignment with the keyway channels 50 and the slide 74 is withdrawn from the keyway 48.

Having described the invention, what is claimed is as follows:

1. A heat exchanger comprising
    a heat exchanger frame;
    a movable plate;
    a plurality of heat transfer plates between the frame and the movable plate;
    a releasable clamping mechanism secured between the frame and the movable plate with an effective length therebetween with the movable plate in an operational position, the clamping mechanism being further adapted to selectively move the movable plate toward the frame to said operational position in which the heat transfer plates are releasably clamped together between the frame and the movable plate under clamping pressure of the movable plate by operation of the clamping mechanism and the clamping mechanism being further adapted to selectively move the movable plate away from the frame to a non-operational position wherein the heat transfer plates are not clamped together, wherein with the movable plate in its non-operational position the heat transfer plates are removable from between the frame and the movable plate without further reconfiguration or dismantling of the heat exchanger,
    wherein the clamping mechanism comprises a hydraulic ram with a hydraulic ram cylinder connected to the frame and with a hydraulic ram rod telescoping from the hydraulic ram cylinder under hydraulic pressure to connection to the moving plate, wherein a positive lock is affixed to the hydraulic ram cylinder in the coaxial direction, and rotatable about a hydraulic ram cylinder centerline and operates to maintain the movable plate in an operational position when hydraulic pressure in the hydraulic ram reduces therein releasing pressure of the hydraulic ram on the movable plate;
    wherein the positive lock further comprises:
    for each hydraulic ram, a housing secured to the hydraulic cylinder near its end and extending coaxially therefrom toward the movable plate and with the hydraulic ram rod extendable through an end hole in a housing end;
    an extension extending from the telescoping hydraulic ram rod to connection to the
    movable plate;
    a tubular slide element slidable on the extension, the slide element further comprising ears extending radially from a slide element end such that the slide element slides on the extension into abutment of said slide element end against said hydraulic ram rod wherein the housing end includes channels opening into the end hole such that the slide element partially passes through the end hole with the ears passing through the channels and into the housing when aligned therewith;
    wherein when the slide element is in abutment with the hydraulic ram rod, the ears are in an effective slot formed between the hydraulic ram rod and an inside of the housing end, the slot being of width substantially equal to a width of the ears such that with the ears in said slot, the slide element rotates on the extension such that the ears are out of alignment with the channels and the ears are thus prevented from exiting the channels therein preventing movement of the hydraulic ram rod until the ears are is again aligned with the channels.

2. The heat exchange of claim 1 wherein said hydraulic ram comprises an upper and a lower hydraulic ram over and under the heat exchanger plates, respectively, each with a hydraulic ram rod telescoping from the hydraulic ram cylinder under hydraulic pressure to connection to the moving plate.

3. The heat exchanger of claim 1 further comprising an upper bar extending horizontally from the frame and slidable through the moving plate from which upper bar the heat transfer plates depend.

4. The heat exchanger of claim 3 further comprising a lower rod extending horizontally from the frame and slidable through the moving plate on which lower rod the heat transfer plates rest, the heat transfer plates being removably attachable between the upper bar and the lower rod and between the frame and the movable plate upon installation in the heat exchanger.

5. The heat exchanger of claim 4 wherein the heat transfer plates are installable and removable from between the upper bar and the lower rod and between the frame when the movable plate is in a non-operational position with the movable plate moved away from the frame by action of the hydraulic ram therein providing unencumbered access to the heat transfer plates.

6. The heat exchanger of claim 5 wherein the heat transfer plates are removable with the movable plate in said non-operational position by disengaging a one heat transfer plate of the plurality of heat transfer plates to be removed from the upper support bar by tilting the heat transfer plate toward the frame and away from the upper support bar and then lifting the heat transfer plate from the lower support rod.

7. The heat exchanger of claim 1 further comprising a lower rod extending horizontally from the frame and slidable through the moving plate on which lower rod the heat transfer plates rest.

8. The heat exchanger of claim 1 wherein said extension is adjustable in length to accommodate a variable number of heat transfer plates.

9. The heat exchanger of claim 8 further comprising said extension being at least partially threaded and further comprising a first nut on the extension on a first side of the movable plate and a second nut on the extension on a second side of the movable plate, the first and second nut being tightened to the movable plate when the movable plate is moved into said operational position.

10. A heat exchanger comprising a heat exchanger frame; a movable plate; a plurality of heat transfer plates between the frame and the movable plate;
  a releasable clamping mechanism secured between the frame and the movable plate with an effective length therebetween with the movable plate in an operational position, the clamping mechanism being further adapted to selectively move the movable plate toward the frame to said operational position in which the heat transfer plates are releasably clamped together between the frame and the movable plate under clamping pressure of the movable plate by operation of the clamping mechanism and the clamping mechanism being further adapted to selectively move the movable plate away from the flame to a non-operational position wherein the heat transfer plates are not clamped together, wherein with the movable plate in its non-operational position the heat transfer plates are removable from between the flame and the movable plate without further reconfiguration or dismantling of the heat exchanger, wherein the clamping mechanism comprises a hydraulic ram with a hydraulic ram cylinder connected to the flame and with a hydraulic ram rod telescoping from the hydraulic ram cylinder under hydraulic pressure to connection to the moving plate,
  a positive lock adapted to releasably secure the movable plate in said operational position after the clamping mechanism has moved the moving plate into said operational position and to maintain the movable plate in said operational position when hydraulic pressure in the hydraulic ram reduces therein releasing pressure of the hydraulic ram on the movable plate,
  an extension extending from the hydraulic ram rod to connect to the movable plate, wherein the extension varies the hydraulic ram length to accommodate the number of heat transfer plates being employed, and maintain the plurality of heat transfer plates under functional pressure during operation of the heat exchanger;
  wherein the positive lock further comprises
  for each hydraulic ram, a housing secured to the hydraulic ram cylinder near its end and extending coaxially therefrom toward the movable plate and with the hydraulic ram rod extendable through an end hole a housing end;
  a tubular slide element slidable on the extension, the slide element further comprising ears extending radially from a slide element end such that the slide element slides on the extension into abutment of said slide end against said hydraulic ram rod wherein the housing end includes channels opening into the end hole such that the slide element partially passes through the end hole with the ears passing through the channels and into the housing when aligned therewith;
  wherein when the slide element is in abutment with the hydraulic ram rod the ears are in a slot formed between the hydraulic ram rod and an inside of the housing end, the slot being of width substantially equal to a width of the ears such that with the ears in said slot, the slide rotates on the extension such that the ears are out of alignment with the channels and the ears are thus prevented from exiting the channels therein preventing movement of the hydraulic ram rod until the ears are again aligned with the channels.

11. The heat exchange of claim 10 wherein said hydraulic ram comprises an upper and a lower hydraulic ram over and under the heat exchanger plates, respectively, each with a hydraulic ram rod telescoping from the hydraulic ram cylinder under hydraulic pressure to connection to the moving plate.

12. The heat exchanger of claim 10 further comprising an upper bar extending horizontally from the frame and slidable through the moving plate from which upper bar the heat transfer plates depend.

13. The heat exchanger of claim 12 further comprising a lower rod extending horizontally from the frame and slidable through the moving plate on which lower rod the heat transfer plates rest, the heat transfer plates removably being attachable between the upper bar and the lower rod and between the frame and the movable plate upon installation in the heat exchanger.

14. The heat exchanger of claim 10 wherein said extension is adjustable in length to accommodate a variable number of heat transfer plates.

15. The heat exchanger of claim 14 further comprising said extension being at least partially threaded and further comprising a first nut on the extension on a first side of the movable plate and a second nut on the extension on a second side of the movable plate, the first and second nut being tightened to the movable plate when the movable plate is moved into said operational position.

16. A heat exchanger comprising a heat exchanger frame; a movable plate; a plurality of heat transfer plates between the frame and the movable plate;
  a releasable clamping mechanism secured between the frame and the movable plate with an effective length therebetween with the movable plate in an operational position, the clamping mechanism being further adapted to selectively move the movable plate toward the frame to said operational position in which the heat transfer plates are releasably clamped together between the frame and the movable plate under clamping pressure of the movable plate by operation of the clamping mechanism and the clamping mechanism being further adapted to selectively move the movable plate away from the flame to a non-operational position wherein the heat transfer plates are not clamped together, wherein with the movable plate in its non-operational position the heat transfer plates are removable from between the flame and the movable plate without further reconfiguration or dismantling of the heat exchanger, wherein the clamping mechanism comprises a hydraulic ram with a hydraulic ram cylinder connected to the flame and with a hydraulic ram rod telescoping from the hydraulic ram cylinder under hydraulic pressure to connection to the moving plate, wherein the a positive lock operates to secure the movable plate in said operational position after the clamping mechanism has moved the moving plate into said operational position, and further operates to maintain the movable plate in said operational position when hydraulic pressure in the hydraulic ram reduces therein releasing pressure of the hydraulic ram on the movable plate, and wherein said hydraulic ram comprises an upper and a lower hydraulic ram over and under the heat exchanger plates, respectively, each with a hydraulic ram rod telescoping from the hydraulic ram cylinder under hydraulic pressure to connection to the moving plate, an upper bar cantilevered horizontally from the frame and slidable through the moving plate from which upper bar the heat transfer plates depend, a lower rod cantilevered horizontally from the frame and slidable through the moving plate on which lower rod the heat transfer plates rest, the heat transfer plates being removably attachable between the upper bar and the lower rod and between the frame and the movable plate upon installation in the heat exchanger, wherein the positive lock comprises:

for each hydraulic ram, a housing secured to the hydraulic ram cylinder near its end and extending coaxially therefrom toward the movable plate and with the hydraulic ram rod extendable through an end hole a housing end;

an extension extending from the telescoping hydraulic ram rod to connection to the movable plate;

a tubular element slide slidable on the extension, the slide element further comprising ears extending radially from a slide element end such that the slide element slides on the extension into abutment of said slide end against said hydraulic ram rod wherein the housing end includes channels opening into the end hole such that the slide element partially passes through the end hole with the ears passing through the channels and into the housing when aligned therewith;

wherein when the slide element is in abutment with the hydraulic ram rod the ears are in a slot formed between the hydraulic ram rod and an inside of the housing end, the slot being of width substantially equal to a width of the ears such that with the ears in said slot, the slide element rotates on the extension such that the ears are out of alignment with the channels and the ears are thus prevented from exiting the channels therein preventing movement of the hydraulic ram rod until the ears are again aligned with the channels.

17. The heat exchanger of claim 16 wherein said extension is adjustable in length to accommodate a variable number of heat transfer plates.

* * * * *